(No Model.)
C. CHERRY, Sr.
PROCESS OF DESULPHURIZING AND PURIFYING ORES PREPARATORY TO SMELTING.
No. 290,213. Patented Dec. 18, 1883.
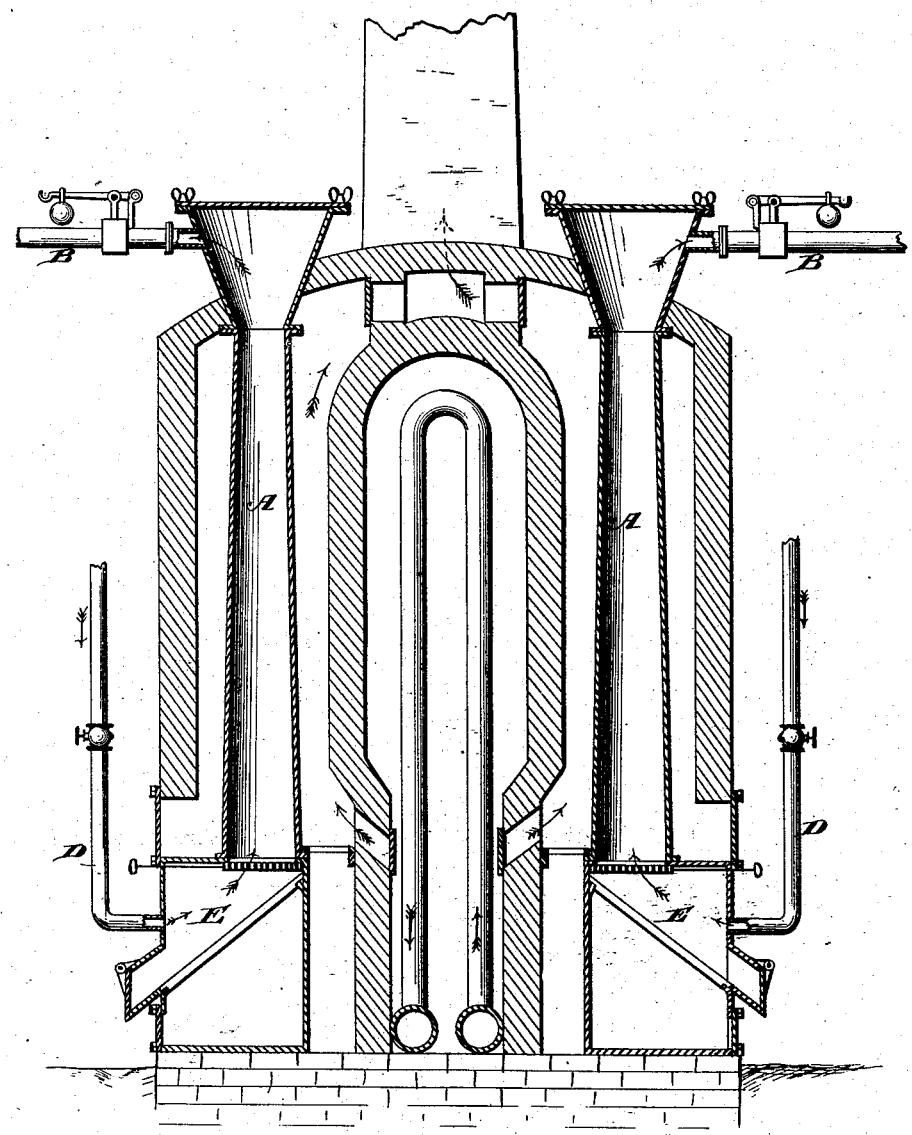
Witnesses.
Robert Swett,
J. A. Rutherford
Inventor:
Cummings Cherry Sr.
By James L. Norris.
Atty.

UNITED STATES PATENT OFFICE.

CUMMINGS CHERRY, SR., OF CHICAGO, ILLINOIS.

PROCESS OF DESULPHURIZING AND PURIFYING ORES PREPARATORY TO SMELTING.

SPECIFICATION forming part of Letters Patent No. 290,213, dated December 18, 1883.

Application filed October 27, 1883. (No model.)

*To all whom it may concern:*

Be it known that I, CUMMINGS CHERRY, Sr., a citizen of the United States, residing at Chicago, Cook county, Illinois, have invented new and useful Improvements in Processes of Desulphurizing and Purifying Ores Preparatory to Smelting, of which the following is a specification.

The object of my invention is to purify iron, gold, silver, copper, and lead ores, and prepare them for smelting by freeing or expelling their injurious impurities—such as phosphorus, sulphur, antimony, arsenic, and other metalloids—and the oxygen from the naturally-formed metallic oxides, which may be combined with them chemically or otherwise in their natural condition, and all other impurities susceptible of being removed in a gaseous form.

In carrying out my invention, the ores to be treated are broken up or crushed into particles of suitable size, or may be pulverized. In case the ores are in a refractory condition, with silex and other impurities of like nature, a mixture of chloride of lime, chloride of soda, and pulverized carbon, or either of them, as the condition may require, is intimately mixed with the crushed ore. The ores, or the ores and mixture, are then placed in a closed retort, muffle, or oven of suitable form and construction to allow their being heated by an external fire.

To illustrate a suitable form of apparatus for carrying out my invention, reference will be made to the accompanying drawing, in which the figure represents a vertical section of said apparatus.

The retort A is constructed air-tight, with a valved outlet or escape pipe, B, at the top, which is arranged with valves to be opened or closed at pleasure, and also to maintain any pressure required within the retort. The retort is also provided with a gas-supply pipe, D, and gas-chamber E at the bottom. The pipe D is arranged with valve for the introduction under perfect control of gases, steam, and air. When the retort is charged, the valve in the pipe D is closed and the valve of the pipe B is regulated to prevent the admission of atmospheric air, but permitting the gases and vapors within to escape. The retort is then subjected to heat until the temperature of the ores has reached 500° to 700° Fahrenheit, or thereabout. This condition is maintained until the water of crystallization and of constitution of the ores and acid formations, and all fugitive gases and volatile substances thus expellable, are vaporized and passed off through the escape-pipe, which has been regulated for that purpose during the treatment to allow the freest escape of the gases compatible with complete exclusion of atmospheric air.

This mode of treatment constitutes the first part or step in my process, and the time occupied or required is about two hours. Under this treatment the cohesion of the ores is partially destroyed by evaporation of their water of crystallization, and all the acid combinations are broken up by the evaporation of their water of constitution. The oxides are partially disintegrated by the removal of the fugitive gases, the volatile substances are vaporized and passed off, and the ores partially deoxidized. The ores and their remaining impurities are thus left in a porous and spongy condition, and are thus prepared or conditioned to act with greater chemical energy and effect in forming the new combinations produced by the second step in my process. Where the fluxes and carbon have been used, the refractory condition has been broken up and the disintegration of the ores greatly assisted.

In the second step, the valve of the escape-pipe B is regulated to main a pressure within the retort A of not less than thirty pounds, and superheated steam is then introduced through the gas-supply pipe D and gas-chamber E until it has attained a pressure of not less than thirty pounds, preferably fifty to sixty pounds, fully permeating the mass. The temperature of the ores in the retort is maintained at 700° to 1,000° Fahrenheit, during which superheated steam is forced under said pressure in sufficient volume to freely pass through the ores or mass and out through the escape-pipe B. This treatment is continued until chemical combinations have been formed with the phosphorus, sulphur, antimony, arsenic, and metalloids or other impurities existing in combination with the ores, and have passed off or been forced through the escape-pipe B in the form of sulphureted hydrogen, phosphureted hydrogen, phosphine, antimonial and arsenical vapors, &c. This condition can readily be ascertained by the odor of the escaping vapors through the pipe B. During this mode of operation the oxygen of the steam has combined with the metal in the ores and a portion of the escaping metalloids forming, with phosphorus, the red oxide of phosphorus or amorphous phosphorus, which remains in the retort. The ores are now substantially free from sulphur and the other metalloids which may have been combined with them, the remaining impurities being in combination with oxygen.

In the third step, the same temperature is maintained, and the steam is then turned off and superheated air is introduced through the pipe D and gas-chamber E until it has attained a pressure within the retort A of not less than ten pounds, preferably twenty to twenty-five pounds. At this stage the valve of the escape-pipe B is so regulated as to maintain the said pressure, and a current of superheated air is forced through the ores under such pressure in sufficient volume to permeate the whole mass, pass through and out at the escape-pipe B. This treatment is continued until all the remaining phosphorus, sulphur, and other metalloids are expelled, and ores susceptible of reoxidation have become thoroughly reoxidized uniformly throughout their whole mass, the time required being about one hour. The ore thus treated is ready for smelting, and may be fed directly into the smelting-furnace in its heated condition. If salts and silica have existed in excess in the ores to be treated, chlorine gas is introduced under pressure in the same manner and under the same pressure as the superheated air, and such treatment continued until the ores have become thoroughly chloridized; but this process of using chlorine gas will be the subject-matter of a separate application for Letters Patent. The treatment should be continuous in the order named, excluding all contact with atmospheric air, except such as is introduced in the manner stated, because the chemical changes are thus under better control of the operator and take place while the gases and elements are in their nascent condition, thereby securing the greatest chemical energy. Ores treated in this manner will be found to be free from phosphorus, sulphur, antimony, arsenic, and other metalloids, and such as are susceptible of reoxidation will have become thoroughly and uniformly reoxidized to protoxides and peroxides, all producing, when smelted, a uniform quality of superior metal.

I do not herein claim, broadly, the roasting or treatment of ores by heat in closed retorts for the purpose of purification, except as in connection with the process described; nor do I claim herein the roasting or treatment of ores by steam in closed retorts, excluding the atmospheric air, except as in connection with the process described, and except under pressure of not less than thirty pounds. The treatment of ores by superheated steam is not new. It has been applied in close retorts to heated and melted ore; but I am not aware that it has been applied so as to maintain a pressure within the retort. The difference in the present process from that in my application filed September 18, 1882, is the action of air under a pressure. I find by actual experiment that the combustion of the phosphorus in the last step was not perfect, except under the pressure named. Prior to this invention ores have been subjected to the action of heated air, the air being introduced into the closed receptacles under pressure without external heat applied to the receptacle containing it. In such treatment the ores were not previously treated, and the purpose was for desulphurizing them. In my process the ores have a preliminary treatment, which frees them from sulphur. The treatment by superheated air then produces a different result—viz., expelling the remaining phosphorus and reoxidizing ores capable of reoxidation. Another essential difference is that under my treatment or process a current of superheated air under pressure is forced through the ores heated by external fire to 700° or 1,000° Fahrenheit.

Having thus described my invention, what I claim is—

1. The process of desulphurizing ores, the same consisting in heating the ores to about 700° or 1,000° Fahrenheit in closed retorts, muffles, or ovens by external fire, and subjecting them to the action of superheated steam under a pressure within the retort of not less than thirty pounds, in the manner substantially as specified.

2. The process of reoxidizing ores and eliminating phosphorus therefrom, the same consisting in subjecting the ores at a temperature of about 700° to 1,000° Fahrenheit in closed retorts, muffles, or ovens by external fire to the action of superheated air under a pressure within the retort of not less than ten pounds, in the manner substantially as specified.

3. The process of purifying ores previous to smelting, consisting in heating the ores or the ores and fluxes in closed retorts, muffles, or ovens by external fire to about 500° to 700° Fahrenheit, and then subjecting the charge thus treated at a temperature of 700° to 1,000° Fahrenheit to the action of steam under a pressure within the retort of not less than thirty pounds, and, finally, subjecting the charge thus treated at a temperature of 700° to 1,000° Fahrenheit to the action of superheated air under a pressure of not less than ten pounds, in the manner substantially as specified.

In testimony whereof I have hereunto set my hand in the presence of two subscribing witnesses.

CUMMINGS CHERRY, Sr.

Witnesses:
JAMES L. NORRIS,
JAMES A. RUTHERFORD.